United States Patent [19]

Frump

[11] 3,886,128

[45] May 27, 1975

[54] OXAZOLINE EMULSIFIER IN POLYMERIZATION OF STYRENE AND BUTADIENE

[75] Inventor: John A. Frump, Terre Haute, Ind.

[73] Assignee: Commercial Solvents Corporation, Terre Haute, Ind.

[22] Filed: Oct. 15, 1973

[21] Appl. No.: 406,755

[52] U.S. Cl............................ 260/84.7; 260/29.7 N
[51] Int. Cl. ............................................... C08f 1/13
[58] Field of Search....... 260/84.7, 307 F, 29.6 MN, 260/29.7 N, 94.6

[56] References Cited
UNITED STATES PATENTS

| | | | |
|---|---|---|---|
| 2,831,858 | 4/1958 | DeBenneville | 260/307 F |
| 3,248,397 | 4/1966 | Purcell | 260/307 F |
| 3,423,349 | 1/1969 | Gagliardi | 260/29.6 MN |
| 3,687,888 | 8/1972 | Frump | 260/80.7 |

*Primary Examiner*—Joseph L. Schofer
*Assistant Examiner*—P. R. Michl
*Attorney, Agent, or Firm*—Robert H. Dewey; Howard E. Post

[57] ABSTRACT

In a process for production of styrene-butadiene copolymer by reacting styrene and butadiene in an emulsion system in the presence of a secondary emulsifying agent, the step of using as said secondary emulsifying agent an oxazoline corresponding to the formula

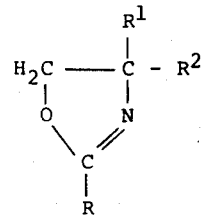

wherein R is alkyl of from three to 17 carbon atoms, and $R^1$ and $R^2$ are methyl, ethyl or hydroxymethyl and can be the same or different.

6 Claims, No Drawings

OXAZOLINE EMULSIFIER IN POLYMERIZATION OF STYRENE AND BUTADIENE

BACKGROUND OF THE INVENTION

This invention relates to an improved process for the production of styrene-butadiene copolymer. In a particular aspect, this invention relates to an improved emulsifier system for the production of styrene-butadiene rubber.

It is conventional to prepare styrene-butadiene copolymer by effecting the polymerization in an emulsion system. The most widely used primary emulsifying agents are mixtures of soaps of rosin and fatty acids and a secondary emulsifier which is usually sodium naphthalene sulfonate. These emulsifiers provide a pH of about 9–10. After the reaction is complete, the latex copolymer is coagulated by acidifying to a pH of about 5 whereat the emulsion breaks and most of the polymer coagulates. It is recovered by filtration through a coarse filter.

Although this process is widely used, it has the disadvantage that the emulsifier is still marginally effective at pH 5 and some of the latex fails to coagulate; as much as 17% unrecovered polymer may pass through the filter and must be coagulated and recovered by other methods, e.g. by severe agitation followed by filtration.

This problem mainly originates from the use of the secondary emulsifier and could be eliminated by eliminating the secondary emulsifier. However, in that case, another more severe problem — that of pre-floc — would be encountered. Pre-floc consists of small particles of copolymer which develop prior to acidification and which are of such size that they tend to plug the filter and hinder filtration.

Accordingly an improved emulsifier system is needed which will provide the needed stability during the polymerization reaction and prevent pre-floc, but which will break satisfactorily upon acidification pH to permit more complete coagulation of the latex and improve the yields.

The use of vinyl oxazolines in the preparation of styrene-butadiene terpolymers is known from J. A. Frump and H. Kruse, U.S. Pat. No. 3,687,888. However, there is no suggestion that the vinyl oxazoline acts as a secondary emulsifier at the start of polymerization and in any case it is consumed by the reaction by the end of the polymerization period.

SUMMARY OF THE INVENTION

It is an object of this invention to provide an improved process for the production of styrene-butadiene copolymer.

It is another object of this invention to provide a secondary emulsifier for the emulsion polymerization process of styrene and butadiene which advantageously provides improved coagulation of the polymer during the acidification step.

Other objects will be apparent to those skilled in the art from the disclosure herein.

It is the discovery of this invention to provide an improvement in the production of styrene-butadiene copolymer by the emulsion polymerization process consisting of the step of using as the secondary emulsifier an oxazoline corresponding to the formula:

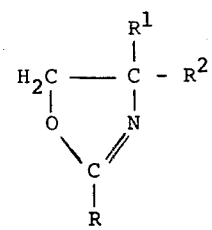

wherein R is alkyl of from three to 17 carbon atoms, and $R^1$ and $R^2$ are methyl, ethyl or hydroxymethyl and can be the same or different.

DETAILED DISCUSSION

In the prior process, of which the present invention is an improvement step, the styrene and butadiene in about a 1:3–4 mole ratio are emulsified in water using the potassium salts of rosin acids as the primary emulsifying agent and sodium naphthalene sulfonate as the secondary emulsifier. A peroxide catalyst and an initiator are added and after a suitable reaction period, a short stopper is introduced to stop the reaction and prevent further polymerization. The emulsion is then acidified to pH 5 which causes the emulsion to "break" and most of the copolymer to coagulate. It is then separated, e.g. by filtration, decantation or other means. Many variations of the above process are known and many other additives are employed for special effects.

It is the discovery of the present invention to use a substituted oxazoline corresponding to the above formula to replace the secondary emulsifier. It is not the intent to limit the practice of this invention to any particular polymerization recipe, etc., but rather it is intended that the invention can be practiced with any known process or variation thereof.

The oxazolines employed in the practice of this invention are known in the art and some of them are commercially available. Generally they can be prepared from alkanolamines corresponding to the formula

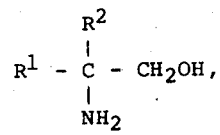

where $R^1$ and $R^2$ have the same meaning defined hereinbefore, and fatty acids corresponding to the formula RCOOH, where R is an alkyl group of from 3–17 carbon atoms. These compounds can be readily prepared by the method of R. F. Purcell, U.S. Pat. No. 3,336,145, the subject matter of which is incorporated herein by reference thereto. These compounds are suitable for use as the crude reaction product and it is not usually necessary to refine them. Typically they may consist of about 70% or more of oxazoline, the remainder being amide and unreacted alkanolamine. The preferred oxazoline is that prepared from 2-amino-2-methyl-1-propanol and coconut oil fatty acids. Generally the fatty acids used are the ordinary grades of commerce and are actually mixtures of closely related fatty acids. Consequently the oxazolines employed in the practice of this invention are often mixtures of closely related oxazolines and the corresponding alkanolamides.

It is understood of course that the practice of this invention is not limited to mixtures. Excellent results are obtained with relatively pure compounds. However, they are considerably more expensive than the crude reaction product, so for this reason, the latter are preferred.

The amount of oxazoline secondary emulsifier can be varied within about 0.01% to about 0.5% based on the weight of the styrene and butadiene content. Preferably, however, the amount of secondary emulsifier is in the range of about 0.05 to about 0.20%, and about 0.1% is particularly preferred.

The advantages resulting from the use of the oxazolines as the secondary emulsifier were particularly surprising because it is known that salts of oxazolines are good surfactants and therefore the acidification step, instead of breaking the emulsion, would have been thought to have stabilized it. Other unexpected advantages include (1) reduced formation of pre-floc which is objectionable because it makes filtration more difficult, (2) improved yield of copolymer, and (3) greater permissible variation in concentration of secondary emulsifier without adverse effect on other factors.

The invention will be better understood with reference to the following examples. It is understood that these examples are intended for illustration only, and it is not intended that the invention be limited thereby.

EXAMPLE 1

Into a thoroughly-cleaned and weighed glass reaction vessel capable of withstanding internal pressure (e.g. a bottle used for carbonated soft drinks) there was delivered 150 ml (149 g) of a soap solution prepared by dissolving 90.5 g of the potassium soap of a modified rosin, (Dresinate 214, a primary emulsifier marketed by Hercules, Inc.) and 8.1 g of potassium chloride in 3901.4 g of distilled water. There was then added 0.075 g of secondary emulsifier, as specified below, and the pH was adjusted to 10 or above with 1% KOH. The vessel and contents were chilled to about 0°–5°C and 21.96 g of styrene-mercaptan solution (prepared by dissolving 1.2 g of n-dodecyl mercaptan in 174.4 g of styrene) was added. About 55 g of liquified butadiene was then introduced and a sufficient amount was allowed to boil off, while monitoring it on a balance, to provide 53.2 g. The vessel was then capped with a metal cap (having a three-sixteenths inch hole drilled therein and lined with rubber septum and aluminum foil, the foil being next to the vessel), and was immediately placed in a steel cylinder which was then installed in a bath-rotator at 17°C and 5 ml of activator solution — prepared by dissolving 88 mg of Sequestrene NA3 (Trisodium Ethylene Diamine Tetraacetate Trihydrate, manufactured by Geigy Industrial Chemical Co.), 44.8 mg $FeSO_4.7H_2O$, and 360 mg of sodium formaldehyde sulfoxylate in 40 g of distilled water — was delivered through the cap by means of a 10 ml hyprodermic syringe equipped with a No. 25 needle.

The bath was closed and rotated for 5 min. Then 0.045 g (0.05 ml) of paramenthane hydroperoxide, a free radical initiator, was added and the vessel was rotated at 30 rpm for 8 hours, after which 0.08 g of N-diethylhydroxylamine short stopper was added and rotation was continued overnight. The vessel was removed from the bath rotator, dried and weighed to obtain the total weight of latex mixture.

The reaction product was recovered by filtering the vessel's contents through a 100 mesh screen to separate prefloc. All pre-floc was dislodged from the walls of the vessel and cap and added to the material on the screen. This material was then dried at 110°C for 4 hours and weighed.

The filtrate was transferred to a weighed beaker and reweighed to obtain the latex final weight. It was acidified to just below pH 5.0 with 1% sulfuric acid solution of known density, and the volume was recorded. The coagulum was occassionally compressed against the wall of the beaker during this step. The supernatant liquid was then decanted from the coagulum. A 5 ml portion of the liquid was delivered to a weighed evaporating dish and dried at 110°C for 4 hours to determine the percentage solids. The amount of uncoagulated copolymer remaining suspended in the supernatant acid solution was determined by multiplying the weight of decanted liquid by the percent solids.

The coagulum was pressed free of liquid by passing through a hand wringer. It was then placed on a sheet of foil and dried at 110° for 4 hours.

The effects of the various secondary emulsifiers were compared by comparing the yields, the amount of pre-floc and the percentage recovery of copolymer.

The yield is defined as $$\frac{\text{total copolymer yield} \times 100}{75}$$

where "total copolymer yield" is defined as weight of dry copolymer plus the copolymer remaining in acid solution, as determined above.

The amount of pre-floc was determined by taking the ratio of weight of dry pre-floc to latex final weight, which was in turn determined by weighing, as set forth above.

The recovery of copolymer was determined by the ratio of weight of dry copolymer to the total copolymer yield, as determined above. A high ratio indicates that the emulsion broke during acidification and little copolymer was recovered from the supernatant liquid.

Following the above procedure, 6 control runs were made using sodium naphthalene sulfonate as the secondary emulsifier in order to establish norms for the yield, prefloc and recovery using the prior process. The results are given in table 1.

Following the above procedure, one run each was made using as the secondary emulsifier an oxazoline prepared as hereinbefore described from hexanoic acid ($R=C_5$) and tris(hydroxymethyl)aminomethane where $R^1$ and $R^2$ are hydroxymethyl: 2-amino-2-ethyl-1,3-propanediol, where $R^1$ is hydroxymethyl and $R^2$ is ethyl: and 2-amino-2-methyl-1-propanol where $R^1$ and $R^2$ are methyl. The results are given in table 2. The recovery from each of these is much higher than the control showing that the emulsion broke very efficiently during the acidification step.

TABLE 1

| | Controls, Using Sodium Napthalene Sulfonate As Secondary Emulsifier | | |
|---|---|---|---|
| Run | Yield | Pre-Floc | Recovery |
| 1 | 56% | 0.020% | 11% |

TABLE 1-Continued

Controls, Using Sodium Napthalene Sulfonate As Secondary Emulsifier

| Run | Yield | Pre-Floc | Recovery |
|---|---|---|---|
| 2 | 71 | 0.009 | 66 |
| 3 | 69 | 0.010 | 51 |
| 4 | 89 | 0.012 | 56 |
| 5 | 76 | 0.005 | 40 |
| 6 | 80 | 0.006 | 34 |
| Mean | 74% | 0.010% | 43% |

TABLE 2

Use of Oxazolines from Hexanoic Acid

| $R^1$ | $R^2$ | Yield | Pre-Floc | Recovery |
|---|---|---|---|---|
| —$CH_2OH$ | —$CH_2OH$ | 81% | 0.100% | 95% |
| —$CH_2OH$ | —$C_2H_5$ | 79 | 0.080 | 98 |
| —$CH_3$ | —$CH_3$ | 94 | 0.310 | 99 |

EXAMPLE 2

The experiment of example 1 was repeated in all essential details except that the oxazoline from octanoic acid ($R=C_7$) and 2-amino-2-ethyl-1, 3-propanediol ($R^1=$ —$CH_2OH$ and $R^2=$ —$C_2H_5$) was substituted for the sodium naphthalene sulfonate. Eight runs were made and the results are given in table 3.

TABLE 3

Oxazoline from Octanoic Acid and AEPD

| Run | Yield | Pre-Floc | Recovery |
|---|---|---|---|
| 1 | 49% | 0.000% | 92% |
| 2 | 64 | 0.060 | 97 |
| 3 | 88 | 0.080 | 98 |
| 4 | 91 | 0.130 | 98 |
| 5 | 85 | 0.130 | 98 |
| 6 | 91 | 0.130 | 98 |
| 7 | 89 | 0.130 | 99 |
| 8 | 70 | 0.030 | 97 |
| Mean | 78 | 0.086 | 97 |

EXAMPLE 3

The experiment of example 1 was repeated in all essential details except that the oxazoline used as the secondary emulsifier was prepared from octanoic acid and 2-amino-2-methyl-1-propanol. The results are given in table 4.

TABLE 4

Oxazoline from Octanoic Acid and AMP

| Run | Yield | Pre-Floc | Recovery |
|---|---|---|---|
| 1 | 71% | 0.080% | 98% |
| 2 | 91 | 0.030 | 99 |
| 3 | 87 | 0.070 | 98 |
| Mean | 83 | 0.060 | 98 |

EXAMPLE 4

The experiment of example 1 was repeated in all essential details except that one run each was made using the oxazoline from (A) lauric acid ($R=C_{11}$) and 2-amino-2-ethyl- 1, 3-propanediol ($R^1=$ —$CH_2OH$, $R^2=$ —$C_2H_5$) and (B) from lauric acid and 2-amino-2-methyl-1-propanol ($R^1$ and $R^2=$ —$CH_3$). The results are given in table 5.

TABLE 5

Oxazolines from Lauric Acid and

| Oxazoline | Yield | Pre-Floc | Recovery |
|---|---|---|---|
| A | 85% | 0.090% | 98% |
| B | 85 | 0.160 | 98 |

EXAMPLE 5

The experiment of example 1 was repeated in all essential details except that one run each was made using the oxazoline from (C) palmitic acid ($R=C_{15}$) and 2-amino-2-ethyl-1, 3-propanediol and (D) from palmitic acid and 2-amino-2-methyl-1-propanol. The results are given in table 6.

TABLE 6

Oxazolines from Palmitic Acid and

| | Yield | Pre-Floc | Recovery |
|---|---|---|---|
| C | 89% | 0.040% | 99% |
| | 82 | 0.080 | 98 |
| D | 84 | 0.010 | 98 |
| | 84 | 0.080 | 98 |

EXAMPLE 6

The experiment of example 1 was repeated in all essential details except that the secondary emulsifier was the oxazoline from coconut fatty acids and 2-amino-2-ethyl-1,3-propanediol. The results are given in table 7.

TABLE 7

Oxazoline from Coconut Fatty Acids and AEPD

| | Yield | Pre-Floc | Recovery |
|---|---|---|---|
| | 65% | 0.070% | 98% |
| | 86 | 0.120 | 99 |
| | 65 | 0.040 | 98 |
| Mean | 72 | 0.077 | 98 |

EXAMPLE 7

The experiment of example 1 was repeated in all essential details except that the secondary emulsifier was the oxazoline from coconut fatty acids and 2-amino-2-methyl-1-propanol. The results are given in table 8.

TABLE 8

Oxazoline from Coconut Fatty Acids and AMP

| Run | Yield | Pre-Floc | Recovery |
|---|---|---|---|
| 1 | 86% | 0.030% | 98% |
| 2 | 88 | 0.170 | 98 |
| 3 | 69 | 0.050 | 98 |
| 4 | 91 | 0.026 | 99 |
| 5 | 89 | 0.009 | 96 |
| 6 | 88 | 0.017 | 98 |
| 7 | 83 | 0.020 | 98 |
| 8 | 93 | 0.021 | 89 |
| 9 | 74 | 0.006 | 98 |
| 10* | 91 | 0.068 | 98 |
| 11** | 91 | 0.059 | 98 |
| 12* | 89 | 0.077 | 98 |
| 13** | 90 | 0.075 | 98 |
| 14* | 90 | 0.056 | 98 |
| 15** | 90 | 0.094 | 98 |
| Mean | 87% | 0.052% | 97% |

*Concentration of oxazoline was 0.066% based on weight of styrene and butadiene.
**Concentration of oxazoline was 0.133% based on weight of styrene and butadiene.

I claim:

1. In a process for the production of a styrenebutadiene copolymer by reacting styrene and butadiene in an emulsion system in the presence of a primary emulsifier and a secondary emulsifier at a temperature of 0° to about 20°C, and coagulating said copolymer by acidifying said emulsion to a pH of about 5, the improvement comprising the step of using as said secondary emulsifier an oxazoline in an amount of about 0.01 to about 0.50% based on the weight of said styrene-butadiene, said oxazoline corresponding to the formula

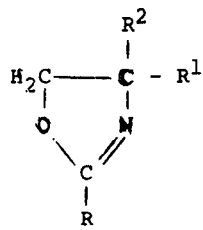

wherein R is an alkyl group of from three to about 17 carbon atoms and $R^1$ and $R^2$ are methyl, ethyl, or hydroxymethyl and can be the same or different.

2. The process of claim 1 wherein $R^1$ and $R^2$ are methyl.

3. The process of claim 1 wherein $R^1$ and $R^2$ are hydroxymethyl.

4. The process of claim 1 wherein $R^1$ is ethyl and $R^2$ is hydroxymethyl.

5. The process of claim 1 wherein said oxazoline is present in an amount of from about 0.05% to about 0.20%.

6. The process of claim 1 wherein said oxazoline is present in an amount of about 0.1%.

* * * * *